United States Patent
Reddy Vennapusa

(10) Patent No.: US 11,341,208 B2
(45) Date of Patent: *May 24, 2022

(54) MOBILE APPLICATION BUNDLED WITH METADATA DATABASE

(71) Applicant: salesforce.com, inc., San Francisco, CA (US)

(72) Inventor: Satyaprakash Reddy Vennapusa, Hyderabad (IN)

(73) Assignee: SALESFORCE.COM, INC., San Francisco, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/858,424

(22) Filed: Apr. 24, 2020

(65) Prior Publication Data

US 2020/0334304 A1 Oct. 22, 2020

Related U.S. Application Data

(63) Continuation of application No. 15/269,009, filed on Sep. 19, 2016, now Pat. No. 10,635,659.

(51) Int. Cl.

| | |
|---|---|
| *G06F 21/00* | (2013.01) |
| *G06F 16/958* | (2019.01) |
| *G06F 16/22* | (2019.01) |
| *G06F 16/951* | (2019.01) |
| *G06F 16/23* | (2019.01) |
| *H04W 12/084* | (2021.01) |

(52) U.S. Cl.
CPC ............ *G06F 16/958* (2019.01); *G06F 16/22* (2019.01); *G06F 16/2379* (2019.01); *G06F 16/951* (2019.01); *H04W 12/084* (2021.01)

(58) Field of Classification Search
CPC ...... G06F 16/958; G06F 16/22; G06F 16/951; G06F 16/2379; H04W 12/084
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

*Primary Examiner* — Kendall Dolly
(74) *Attorney, Agent, or Firm* — Schwabe Williamson & Wyatt

(57) ABSTRACT

Customization objects stored in a local database may be used to customize webpages and applications rendered in, or executed by a mobile application implemented by a mobile device (app). Upon authenticating the app, a service provider may determine whether any customization objects have been updated since a previous authentication of the app, and may update the mobile database with the updated customization objects. This way, the mobile device does not have to obtain customization objects from remote storage of the service provider each time a webpage is requested thereby reducing signaling overhead and decreasing webpage rendering time.

20 Claims, 6 Drawing Sheets

(56) References Cited

U.S. PATENT DOCUMENTS

| | | |
|---|---|---|
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,601,467 B2 | 12/2013 | Hofhansi |
| 8,646,103 B2 | 2/2014 | Jakobson et al. |
| 10,069,914 B1 * | 9/2018 | Smith .................. H04L 63/0428 |
| 10,965,750 B2 * | 3/2021 | Konik .................. H04L 67/1097 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 * | 4/2003 | Coker .................... G06F 9/547 719/318 |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0230559 A1 * | 11/2004 | Newman .................. G06F 16/25 |
| 2004/0249854 A1 | 12/2004 | Barnes-Leon et al. |
| 2004/0260534 A1 | 12/2004 | Pak et al. |

(56) References Cited

U.S. PATENT DOCUMENTS

| | | |
|---|---|---|
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0162509 A1* | 7/2008 | Becker ................ G06F 16/2379 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0332401 A1* | 12/2010 | Prahlad ............... H04L 63/0428 |
| | | 705/80 |
| 2011/0161327 A1* | 6/2011 | Pawar .................... G06F 16/13 |
| | | 707/741 |
| 2011/0218958 A1 | 9/2011 | Warshavsky |
| 2011/0247051 A1 | 10/2011 | Bulumulla |
| 2011/0270857 A1 | 11/2011 | Bommireddipalli |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2012/0330924 A1* | 12/2012 | Rajan ................... G06F 16/2453 |
| | | 707/714 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2015/0046204 A1* | 2/2015 | Sitina .................. G06Q 10/063 |
| | | 705/7.11 |
| 2016/0098265 A1* | 4/2016 | Mahajan ................ H04L 67/34 |
| | | 717/170 |
| 2016/0109875 A1* | 4/2016 | Majewski ........... G06F 21/6227 |
| | | 700/98 |
| 2016/0321021 A1 | 11/2016 | Derut |
| 2017/0192773 A1 | 7/2017 | Trevathan et al. |

* cited by examiner

MOBILE APPLICATION BUNDLED WITH METADATA DATABASE

RELATED APPLICATIONS

This application is a continuation of U.S. application Ser. No. 15/269,009, now U.S. Pat. No. 10,635,659, filed on Sep. 19, 2016, the contents of which is hereby incorporated by reference in its entirety.

TECHNICAL FIELD

The present disclosure relates generally to data processing and database management technologies, and mobile applications technologies, and in particular to technologies for customization and application making capabilities.

BACKGROUND

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever Applications that are tailored to run on mobile devices (e.g., smartphones, tablet personal computers (PCs), and the like) usually include a container in which an application specific website or collection of webpages may be rendered or displayed. These mobile applications may be customized for a user or organization using metadata. The metadata is typically stored in a metadata database (DB) associated with the user or organization, which is typically located in a remote storage facility of a cloud computing service, an enterprise information technology service, customer relationship management system, and/or other like service providers. In order to render a webpage in the mobile application container, the mobile application requests and downloads associated metadata along with other data each time a webpage is requested. Constantly requesting metadata for rendering in the mobile application container each time a webpage is requested increases signaling overhead and may delay rendering of the requested page thereby increasing user frustration.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
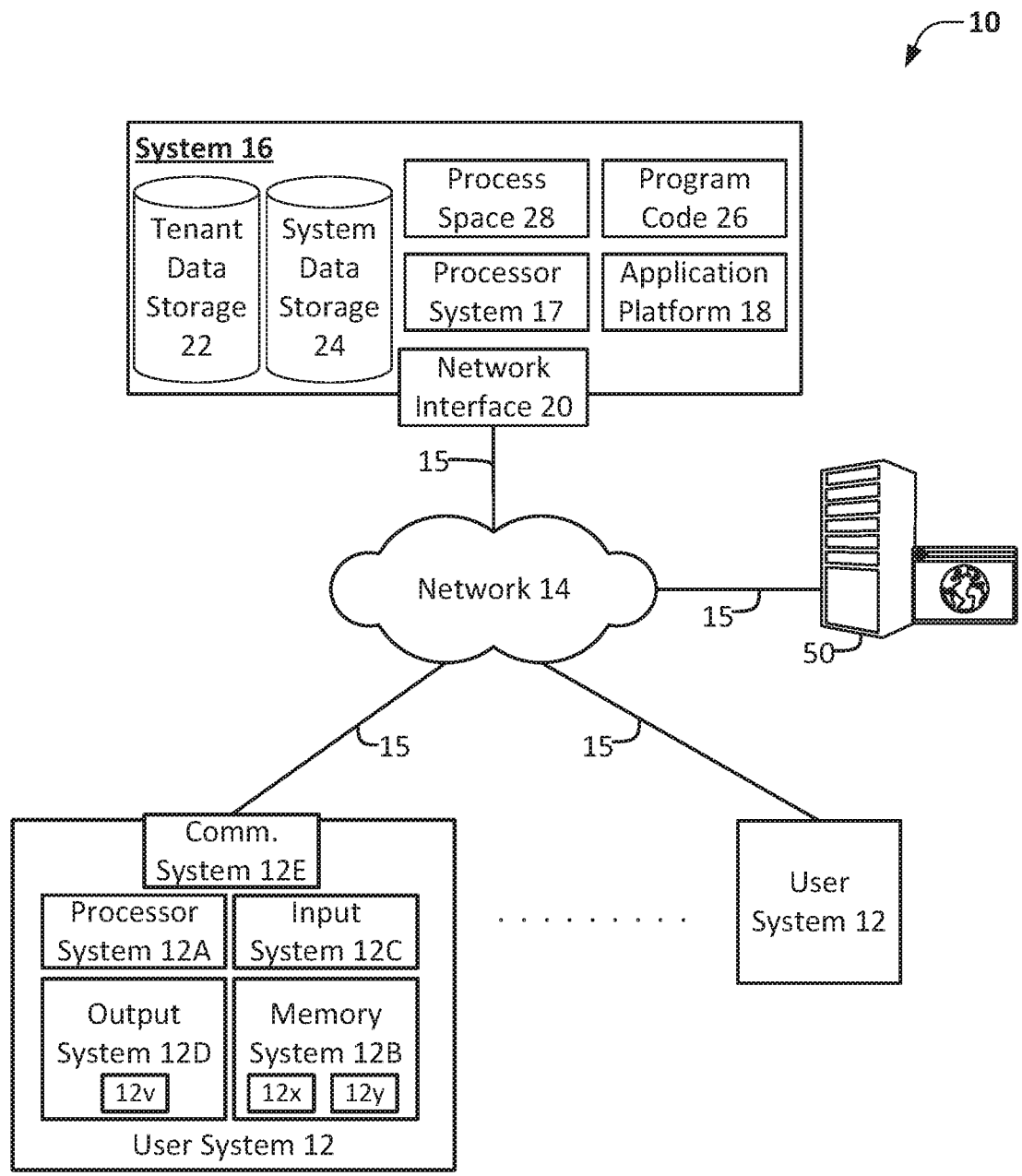
FIG. 1A shows a block diagram of an example environment in which an on-demand database service can be used according to some implementations.

Today mobile applications download metadata along with other data on the fly and construct views, render webpages, and/or the like. Example embodiments presented herein reduce the amount of metadata downloads thereby improving page loading times and reducing signaling overhead. As an example, a plurality of organizations (org) may utilize a mobile application ("mobile app" or "app") provided by an enterprise or service provider (e.g., a cloud computing service, an enterprise, a social networking service, a customer relationship management (CRM) service, etc.) to deliver their own applications and services to their clients (e.g., customers). Each org may have a large set of customizations for the mobile application that allows them to deliver their applications/services to their clients. These org may also have customizations that allow their agents (e.g., salespersons, employees, customer service representatives, etc.) to utilize the mobile application to deliver the org's applications/services.

Instead of providing a same version of the mobile app for each org and each org's agents, example embodiments provide a way to build a customized version of an app that utilizes a client metadata database (DB) for storing customization data for the app. In embodiments, the app is bundled with its own metadata DB (also referred to as a "mobile DB," "client DB," "mobile cache," "metadata cache," and the like) that stores all required customizations for a particular org and/or for that org's clients or agents. The metadata used to customize the mobile application may be referred to as "customization objects," "app metadata," "app runtime parameters," "app runtime configuration," or "app runtime customizations," "entity metadata," and/or the like. This eliminates or greatly reduces the transfer of redundant data to mobile user systems, which conserves computing and network resources.

In various embodiments, when a mobile device uses the app to log into an enterprise system/network or service provider system, instead of requesting customization objects from a remote storage associated with an org (e.g., by making calls to simple object access protocol (SOAP) and/or representational state transfer (REST) application programming interfaces (APIs) for metadata), the mobile application may obtain customization objects from the mobile DB. The app may then use the obtained customization objects for implementing customizations of the mobile application that are unique to that org. For example, the customizations may include rendering a webpage in the app in a customized manner, executing org-specific applications, and/or the like.

In various embodiments, upon logging in, the enterprise system/network or service provider system may determine if there have been any changes to customization objects associated with the mobile application and/or org since the last time the mobile device used the mobile application to log in. If there is a change to the customization objects, then the enterprise system/network or service provider system may synchronize its own metadata DB with the mobile DB in one direction. In this way, the mobile DB may include the updated customization objects. In embodiments, the synchronization may occur on a page-by-page basis, wherein only updated customization objects associated with a requested webpage or content is provided to the mobile DB through the mobile application.

The example embodiments may provide the following advantages: example embodiments reduce signaling and network calls made from mobile applications to server-side applications thereby reducing overhead costs; example embodiments improve page loading performance drastically since obtaining data from local storage is typically faster than obtaining data using over the air interfaces; and the mobile DB of the example embodiments may be provided as an add-on feature, and thus, may be easily deployed with already existing mobile apps and enterprise/service provider infrastructure.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Example embodiments of the present disclosure may be described in terms of a multitenant and/or cloud computing architecture or platform. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Multi-tenancy is a feature of cloud computing where physical or virtual resources are allocated in such a way that multiple tenants and their computations and data are isolated from and inaccessible to one another. As used herein, the term "tenant" refers to a group of users (e.g., cloud service users) who share common access with specific privileges to a software instance and/or a set of computing resources. Tenants may be individuals, orgs, or enterprises that are customers or users of a cloud computing service or platform. However, a given cloud service customer org could have many different tenancies with a single cloud service provider representing different groups within the org. A multi-tenant platform or architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, Inc. of San Francisco, Calif. salesforce.com, Inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, Inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a system 16 (also referred to herein as a "cloud-based system," "database system," "cloud computing service," or the like), and one or more customer platforms (CPs) 50. The cloud system 16 includes a processor system 17, an application platform 18, a network interface 20, tenant database (DB) 22 for storing tenant data 23 (see e.g., FIG. 1B), system DB 24 for storing system data 25 (see FIG. 1B), program code 26 for implementing various functions of the system 16, and process space 28 for executing DB system processes and tenant-specific processes, such as running applications as part of an application hosting service. In some other implementations, environment 10 may not have all of these components or systems, or may have other components or systems instead of, or in addition to, those listed above.

Figure 1B:
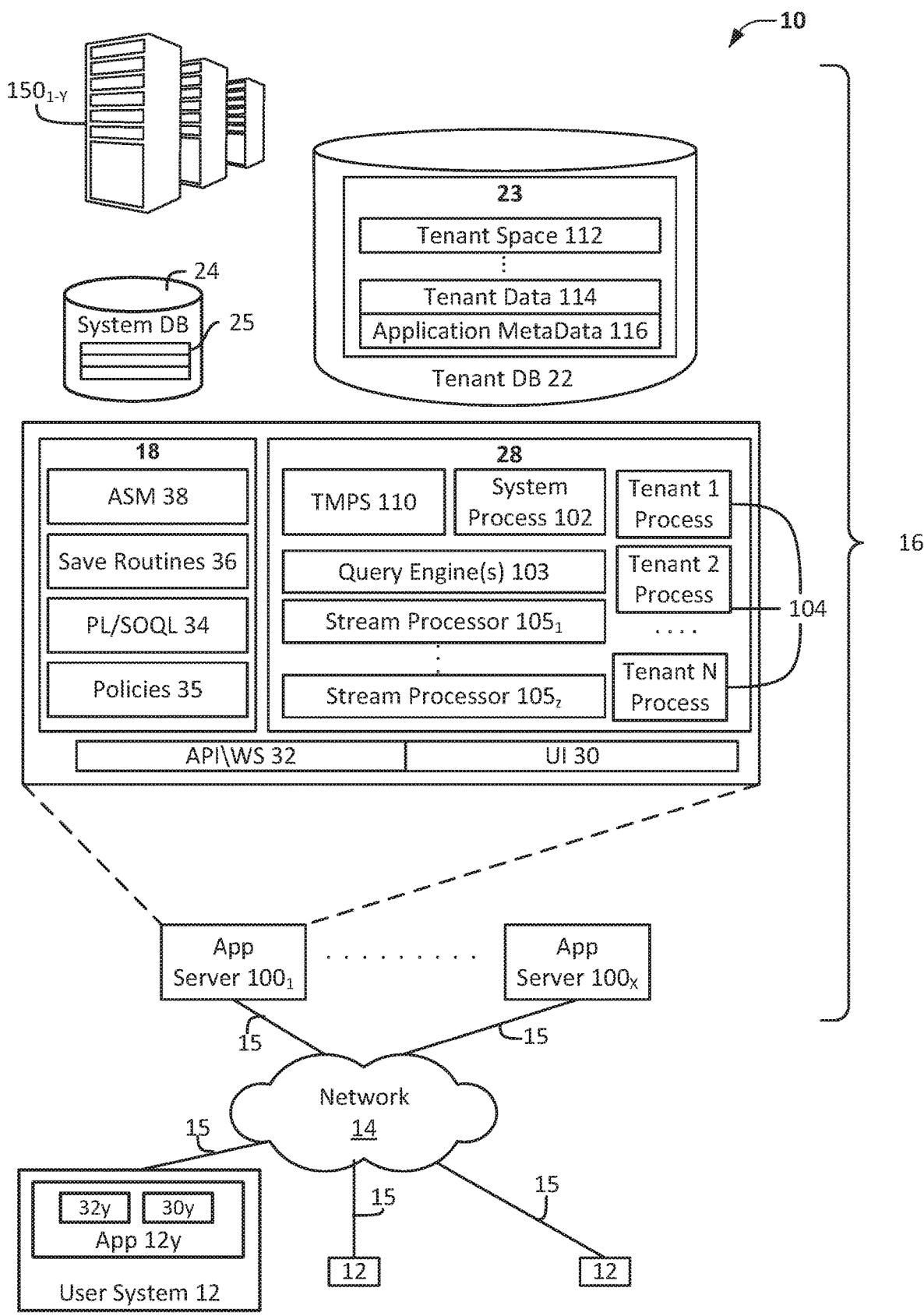
FIG. 1B shows a block diagram of example implementations of elements of FIG. 1A and example interconnections between these elements according to some implementations.

The system 16 may be a DB system and/or a cloud computing service comprising a network or other interconnection of computing systems (e.g., servers, storage devices, applications, etc., such as those discussed with regard to FIGS. 1A-1B infra) that provides access to a pool of physical and/or virtual resources. In some implementations, the system 16 is a multi-tenant DB system and/or a multi-tenant cloud computing platform. In some implementations, the system 16 provides a Communications as a Service (CaaS), Compute as a Service (CompaaS), Database as a Service (DaaS), Data Storage as a Service (DSaaS), Firewall as a Service (FWaaS), Function-as-a-Service (FaaS), Infrastructure as a Service (IaaS), Network as a Service (NaaS), Platform as a Service (PaaS), Security as a Service, Software as a Service (SaaS), GPU-as-a-Service (GaaS), Acceleration-as-a-Service (AaaS), and/or other like cloud services.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12. The third party application developers may be developers associated with CP 50 or the like.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

The tenant data storage 22, the system data storage 24, and/or some other data store (not shown) include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or DB, and, in some instances, a DB application (e.g., OODBMS or RDBMS) as is well known in the art. It should also be understood that "server system" and "server" are often used interchangeably herein. Similarly, the DB objects (DBOs) described herein can be implemented as part of a single DB, a distributed DB, a collection of distributed DBs, a DB with redundant online or offline backups or other redundancies, etc., and can include a distributed DB or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Internet Protocol (IP), Internet Protocol Security (IPsec), Session Initiation Protocol (SIP) with Real-Time Transport Protocol (RTP or Secure RTP (SRTP), Internet Control Message Protocol (ICMP), User Datagram Protocol (UDP), QUIC (sometimes referred to as "Quick UDP Internet Connections"), Stream Control Transmission Protocol (SCTP), Web-based secure shell (SSH), Extensible Messaging and Presence Protocol (XMPP), WebSocket protocol, Internet Group Management Protocol (IGMP), Internet Control Message Protocol (ICMP), etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include code or source code documents (e.g., HTML, XML, JSON, Apex®, CSS, JSP, MessagePack™, Apache® Thrift™, ASN.1, Google® Protocol Buffers (protobuf), DBOs, or some other like object(s)/document(s)). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (e.g., a "smartphone"), a Head-Up Display (HUD) device/system, a an Extended Reality (XR) device (e.g., Virtual Reality (VR), Augmented Reality (AR), and/or Mixed Reality (MR) device), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As shown by FIG. 1A, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors (such as those discussed herein), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), System-on-Chips (SoCs) and/or programmable SoCs, microprocessors or controllers, or any other electronic circuitry capable of executing program code and/or software modules to perform arithmetic, logical, and/or input/output operations, or any suitable combination thereof. As examples, the processor system 12A may include Intel® Pentium® or Core™ based processor(s); AMD Zen® Core Architecture processor(s), such as Ryzen® processor(s) or Accelerated Processing Units (APUs), MxGPUs, or the like; A, S, W, and T series processor(s) from Apple® Inc.; Snapdragon™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; GeForce®, Tegra®, Titan X®, Tesla®, Shield®, and/or other like GPUs provided by Nvidia®; and/or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (e.g., application(s) 12y and/or other applications discussed herein) for carrying out the procedures, processes, methods, etc. of the embodiments discussed herein, as well as an operating system (OS) 12x and one or more DBs or DBOs (not shown).

The application(s) 12y (also referred to as "app 12y" or "apps 12y") is/are a software application designed to run on the user system 12 and is used to access data stored by the system 16. The apps 12y may be platform-specific, such as when the user system 12 is implemented in a mobile device, such as a smartphone, tablet computer, and the like. The apps 12y may be a native application, a web app, or a hybrid app (or variants thereof). One such app 12y may be the previously discussed HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web apps allowing a user (e.g., a subscriber of on-demand services provided by the system 16) of the user system 12 to access, process and view information, pages, interfaces (e.g., UI 30 in FIG. 1B), and application(s) 12y available to it from the system 16 over the network 14. In other implementations, each user system 12 may operate a web or user app 12y designed to interact with applications of the application platform 18 allowing a user (e.g., a subscriber of on-demand services provided by the system 16) of the user system 12 to access, process and view information, pages, interfaces (e.g., UI 30 in FIG. 1B), and apps 12y available to it from the system 16 over the network 14. In some cases, an owner/operator of system 16 may have pre-built the web or user apps 12y for use by clients, customers, and/or agents of a tenant organization (org) to access a tenant space or enterprise social network of that tenant org. In some cases, developers associated with a tenant org (e.g., CP 50) may build custom application(s) for interacting with the tenant data. The user (or third party) application(s) may be native app(s) (e.g., executed and rendered in a container) or hybrid app(s) (e.g., web apps being executed/rendered in a container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the system 16, and/or a platform of a third party system/platform. The web, user, or third party application(s) 12y discussed herein may be a software, program code, logic modules, application packages, etc. that are built using one or more programming languages and/or development tools, such as those discussed herein. Furthermore, such applications may utilize a suitable querying language to query and store information in an associated tenant space, such as, for example, the various query languages discussed herein or the like. The apps 12y may be developed using any suitable programming language and/or development tools such as any of those discussed herein. In some implementations, the apps 12y may be developed using platform-specific development tools and/or programming languages such as those discussed herein.

In an example, the user systems 12 may implement web, user, or third party apps 12y to request and obtain data from system 16, and render graphical user interfaces (GUIs) in an application container or browser. These GUIs may correspond with GUI 12v and/or UI 30 shown and described with respect to FIG. 1B. In some implementations, the GUIs may include a data analytics GUI, such as Salesforce® Wave™ dashboard, Tableau® Desktop®, and the like, which may provide visual representations of data (also referred to as visual representations 12v or the like) residing in an enterprise cloud or in an on-demand services environment (e.g., a tenant space within system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of DB 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user_id), password, personal identification number (PIN), digital certificates, etc.) to the system 16 so that the system 16 may authenticate the identity of a user of the user system 12.

In some embodiments, the user system 12 may include Trusted Compute resources that preserve data confidentiality, execution integrity and enforces data access policies. The Trusted Compute resources may be used to store cryptographic keys, digital certificates, credentials, and/or other sensitive information, and could be used to operate some aspects of an app 12y. The Trusted Compute resources can be implemented using software-based cryptographic security guarantees (e.g., Zero-Knowledge Proofs), virtualization using user-level or OS-level isolation (e.g., "containerization") or virtualization (e.g., using VMs), Trusted Multi-Party-Compute (MPC) resources, or using a Trusted Execution Environment (TEE). In either embodiment, an app 12y is capable of interfacing with the Trusted Compute resources using a suitable API 32 (see e.g., FIG. 1B). Where the Trusted Compute resources is/are implemented using secure enclaves, the app 12y can also interface directly with the enclave of a secure application or other like entity, and/or interface with other enclaves.

A TEE is a hardware-based technology that executes only validated tasks, produces attested results, provides protection from malicious host software, and ensures confidentiality of shared encrypted data. The TEE operates as a protected area accessible to the processor system 12A to enable secure access to data and secure execution of instructions. In some implementations, the TEE may be a physical hardware device that is separate from other components of the user system 12 such as a secure-embedded controller, a dedicated SoC, or a tamper-resistant chipset or microcontroller with embedded processing devices and memory devices (sometimes referred to as a hardware security module (HSM) or a trusted platform module (TPM)). Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like. In other implementations, the TEE may be realized using secure enclaves, which are isolated regions of code and/or data within the processor and/or memory/storage circuitry of the user system 12. Only code executed within a secure enclave may access data within the same secure enclave, and the secure enclave may only be accessible using the secure application (which may be implemented by an application processor or a tamper-resistant microcontroller). Various implementations of the TEE, and an accompanying secure area in the processor system 12A or the memory system 12B may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the user system 12 through the TEE and the processor system 12A.

Each user system 12 typically includes an operating system (OS) 12x to manage computer hardware and software resources, and provide common services for various apps 12y. The OS 12x includes one or more drivers and/or APIs that provide an interface to hardware devices thereby enabling the OS 12x and applications to access hardware functions. The OS 12x includes middleware that connects two or more separate applications or connects apps 12y with underlying hardware components beyond those available from the drivers/APIs of the OS 12x. The OS 12x may be a general purpose OS or a platform-specific OS specifically written for and tailored to the user system 12.

The input system 12C can include any suitable combination of input devices, such as touchscreen interfaces, touchpad interfaces, keyboards, mice, trackballs, scanners, cameras, a pen or stylus, microphones, or other like interfaces. The input devices of input system 12C may be used for interacting with a GUI provided by a browser or client application on a display of output system 12D (e.g., a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. The output system 12D can include any suitable combination of output devices, such as one or more display devices, printers, or interfaces to networks. The output system 12D is used to display visual representations and/or GUIs 12v based on various user interactions. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the system 16. Communications system 12E may include one or more processors (e.g., baseband processors, network interface controllers, etc.) that are dedicated to a particular wireless communication protocol (e.g., WiFi and/or IEEE 802.11 protocols), a cellular communication protocols (e.g., Long Term Evolution (LTE) and the like), wireless personal area network (WPAN) protocol (e.g., IEEE 802.15.4-802.15.5 protocols, Bluetooth or Bluetooth low energy (BLE), etc.), and/or wired communication protocol (e.g., Ethernet, Synchronous optical networking (SONET) and Synchronous Digital Hierarchy (SDH), High-Level Data Link Control (HDLC), Frame Relay, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the system 16, the user system 12 using the communications system 12E may establish link 15 with network interface 20 of the system 16.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices (e.g., processor system 12B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, Advanced Micro Devices (AMD) Zen® Core Architecture processor(s), such as Ryzen® or Epyc® processor(s), Accelerated Processing Units (APUs), MxGPUs, or the like; ARM-based processor(s) licensed from ARM Holdings, Ltd. such as the ARM Cortex-A family of processors and the ThunderX2® provided by Cavium™, Inc.; Centrig™ processor(s) from Qualcomm® Technologies, Inc.; Power Architecture processor(s) provided by the OpenPOWER® Foundation and/or IBM®; GeForce®, Tegra®, Titan X®, Tesla®, Shield®, and/or other like GPUs provided by Nvidia®; a MIPS-based design from MIPS Technologies, Inc. such as MIPS Warrior P-class processors; and/or the like, or the like.

The various subsystems/circuitries of the user system 12 may communicate with one another (e.g., to transfer data, etc.) using a suitable interconnect (IX) or bus technology. The IX may comprise any number and/or combination of bus and/or IX technologies such as a high-speed serial bus, parallel bus, Industry Standard Architecture (ISA), extended ISA, inter-integrated circuit ($I^2C$), Serial Peripheral Interface, universal serial bus (USB), Front-Side-Bus (FSB), Peripheral Component Interconnect (PCI), a PCI-Express (PCI-e), PCI extended (PCIx), Small Computer System Interface (SCSI), SCSI parallel interface, universal asynchronous receiver/transmitter (UART), point-to-point interfaces, power management bus (PMBus), Intel® Ultra Path Interconnect (UPI), Intel® Accelerator Link, Intel® Common Express Link (CXL), RapidIO™ system IXs, CCIX, Gen-Z Consortium IXs, a HyperTransport interconnect, NVLink provided by NVIDIA®, Coherent Accelerator Processor Interface (CAPI), OpenCAPI, Intel® QuickPath Interconnect (QPI), Intel® Omni-Path Architecture IX, and/or any number of other IX technologies. The IX technology may be a proprietary bus, for example, used in an SoC based system.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

The CP 50 includes one or more physical and/or virtualized systems for providing content and/or functionality (i.e., services) to one or more clients (e.g., user system 12) over a network (e.g., network 14). The physical and/or virtualized systems include one or more logically or physically connected servers and/or data storage devices distributed locally or across one or more geographic locations. Generally, the CP 50 is configured to use IP/network resources to provide web pages, forms, applications, data, services, and/or media content to different user system 12. As examples, the CP 50 may provide search engine services; social networking and/or microblogging services; content (media) streaming services; e-commerce services; blockchain services; communication services such as Voice-over-Internet Protocol (VoIP) sessions, text messaging, group communication sessions, and the like; immersive gaming experiences; and/or other like services. The user systems 12 that utilize services provided by CP 50 may be referred to as "subscribers" of CP 50 or the like. Although FIG. 1A shows only a single CP 50, the CP 50 may represent multiple individual CPs 50, each of which may have their own subscribing user systems 12.

CP 50 (also referred to as an "enterprise," "service provider platform", "tenant", "tenant org", or the like) may be a customer or tenant of the system 16 that develops applications that interact and/or integrate with the system 16 and utilize data from an associated tenant space in tenant DB 22; these applications may be referred to as "customer apps," "CP apps," or the like. In embodiments, the app 12y may be a CP app. The term "customer platform" or "CP" as used herein may refer to both the platform and/or applications themselves, as well as the owners, operators, and/or developers associated with the customer platform. The CP apps may obtain data from the associated tenant space 112 (see e.g., FIG. 1B) using one or more APIs 32y to render/display visual representations 30y of relevant tenant data 114 (see e.g., FIG. 1B). In some cases, the CP apps utilize tenant data 114 for interacting with user systems 12 (e.g., subscribers of the CP 50) via the system 16. To do so, the CP apps include program code or script(s) that call APIs/WS 32 (see e.g., FIG. 1B) to access tenant data 114 and/or otherwise interact with the tenant space 112.

FIG. 1B shows example implementations of elements of FIG. 1A and example interconnections between these elements according to some implementations. That is, FIG. 1B also illustrates environment 10, but FIG. 1B shows various elements of the system 16 and various interconnections between such elements are shown with more specificity according to some more specific implementations. In other implementations, the environment 10 may not have the same elements as those shown by FIG. 1B or may have other elements instead of, or in addition to, those listed.

In FIG. 1B, the network interface 20 and/or processor system 17 is/are implemented as a set of application servers 100₁-100ₓ (where X is a number). Each application server 100 (also referred to herein as an "app server", an "API server", an "HTTP application server," a "worker node", and/or the like) is configurable or operable to communicate with tenant DB 22 and the tenant data 23 therein, as well as system DB 24 and the system data 25 therein, to serve requests received from the user systems 12. Each app server 100 may include components that are the same as those discussed previously with respect to the user system 12, such as processor system(s), memory system(s), communication system(s) (e.g., network interface(s), etc.), input system(s), output system(s), and other like systems, that may be communicatively coupled with one another via a suitable IX/bus technology.

The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire org that is a tenant can be stored to tenant storage space 112.

The process space 28 includes system process space 102, individual tenant process spaces 104 and a tenant management process space (TMPS) 110. In various embodiments, the process space 28 includes one or more query processors 103 and one or more stream processors $105_1$ to $105_z$ (where z is a number). In some implementations, the stream processor(s) 105 is/are systems and/or applications that send or receive data streams and execute the applications or analytics logic in response to detecting events or triggers in/from the data streams. The stream processor(s) 105 process data directly as it is produced or received and detect conditions from the data streams within a relatively small time period (e.g., measured in terms of milliseconds to minutes). The stream processor(s) 105 may be implemented as software components (e.g., software engines, software agents, artificial intelligence (AI) agents, modules, objects, or other like logical units), as individual hardware elements, or a combination thereof. In an example software-based implementation, the stream processor(s) 105 may be developed using a suitable programming language, development tools/environments, etc., which are executed by one or more processors of one or more computing systems (see e.g., processor system 17 of FIG. 1A). In this example, program code of the stream processor(s) 105 may be executed by a single processor or by multiple processing devices. In an example hardware-based implementation, the stream processor(s) are implemented by respective hardware elements, such as GPUs (or floating point units within one or more GPUs), hardware accelerators (e.g., FPGAs, ASICs, DSPs, SoCs, digital signal controllers (DSCs), etc.) that are configured with appropriate logic blocks, bit stream(s), etc. to perform their respective functions, AI accelerating co-processor(s), tensor processing units (TPUs), and/or the like. In some embodiments, the stream processor(s) may be implemented using stream processor(s), which are systems and/or applications that send or receive data streams and execute the applications or analytics logic in response to detecting events or triggers from the data streams. The stream processor(s) process data directly as it is produced or received and detect conditions from the data streams within a relatively small time period (e.g., measured in terms of milliseconds to minutes). The stream processor(s) may be implemented using any stream/event processing engines or stream analytics engines such as, for example, Apache® Kafka®, Apache® Storm®, Apache® Flink®, Apache® Apex®, Apache® Spark®, IBM® Spade, Nvidia® CUDA™, Intel® Ct™, Ampa™ provided by Software AG®, StreamC™ from Stream Processors, Inc., and/or the like. In some implementations, the stream processor(s) 105 may implement or operate virtual machines (VMs), containers, or other suitable runtime environment(s) in which user apps, web apps, and/or CP apps may be executed. In some implementations, the query processor(s) 103 may also be stream processor(s) that are the same or similar to stream processor(s) 105.

The application platform 18 includes an application setup mechanism (ASM) 38 that supports application developers' ("app developers") creation and management of applications. Such applications and others can be saved as metadata into tenant DB 22 by save routines (SRs) 36 for execution by subscribers as one or more tenant process spaces 104 managed by tenant management process 110, for example. Invocations to such applications can be coded using Procedural Language (PL)/Salesforce® Object Query Language (SOQL) 34, which provides a programming language style interface extension to Application Programming Interface (API) 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a VM, container, or other isolated user-instance.

In some implementations, the application platform 18 also includes policies 35. The policies 35 comprise documents and/or data structures that define a set of rules that govern the behavior of the various subsystems of the app server 100. For example, one or more of the policies 35 may dictate how to handle network traffic for specific network addresses (or address ranges), protocols, services, applications, content types, etc., based on an org's information security (infosec) policies, regulatory and/or auditing policies, access control lists (ACLs), and the like. Additionally, the policies 35 can specify (within various levels of granularity) particular users, and user groups, that are authorized to access particular resources or types of resources, based on the org's hierarchical structure, and security and regulatory requirements. The documents or data structures of the policies 35 may include a "description," which is a collection of software modules, program code, logic blocks, parameters, rules, conditions, etc., that may be used by the app server 100 to control the operation of the app server 100 and/or access to various services. Any suitable programming languages, markup languages, schema languages, etc., may be used to define individual policies 35 and instantiate instances of those policies 35. As examples, the policies 35 may be defined using XML, JSON, markdown, IFTTT ("If This Then That"), PADS markup language (PADS/ML), Nettle, Capirca™, and/or some other suitable data format, such as those discussed herein.

The application platform 18 may be, or may include, a development environment, programming language(s), and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web app, or a hybrid app including GUIs that render an SDE/IDE/SDK/SDP implemented by a backend service (e.g., system 16) in a web browser or application container).

As mentioned previously, CPs 50 may be customers or tenants of the system 16 that develop CP apps that interact and/or integrate with the system 16 and utilize data from an associated tenant space in tenant DB 22. These CP apps may operate on or in the application platform 18, and may be developed using the aforementioned dev-environment. For example, CP apps may include or provide commerce apps/services (e.g., storefront and/or shopping cart apps, point-of-sale (PoS) apps/services, Warehouse Management System (WMS) and/or Enterprise Resource Planning (ERP) apps/services, etc.), digital marketing and engagement apps/services, advertisement network services data analytics apps/services, blockchain apps/services, and/or the like.

To integrate with the system 16, the CP apps include program code or script(s) that call the APIs/WS 32 to create and activate orders. The CP apps may also include program code/scripts that call APIs/WS 32 to adjust the orders as discussed herein. The CP apps may also call the APIs/WS 32 to return aggregate statistics about various orders. In some embodiments, the CP apps 50 may be the client app 12$y$ discussed previously, or a web app that is rendered and/or executed by the client app 12$y$ (e.g., where the CP apps 50 are web apps and the client app 12$y$ is a browser or other HTTP client that renders the web apps, executes client-side scripts, and/or the like). In other embodiments, the CP apps 50 may be server-side (e.g., CP 50 side) applications, that interact with the user-facing client app 12$y$.

The system 16 of FIG. 1B also includes a user interface (UI) 30 and one or more APIs 32 (also referred to as a "web service") to system 16 resident processes, which allow users or developers at user systems 12 to access the resident processes. The API(s) 32 is/are interface(s) for software components to communicate with each other. In some implementations, the API(s) 32 are source code specification(s) or a collection of libraries, routines, methods, data structures, fields, objects, classes, variables, remote calls, and the like that defines how a software element may access or interact with the underlying platform capabilities and features of the CP 50. Developers and programmers can use the API(s) 32 by importing the relevant classes and writing statements that instantiate the classes and call their methods, fields, etc. The application (app) code, app/service templates, and/or policies 35 developed by customer platforms may be pushed or otherwise sent to the system 16 using one or more APIs 32. In these implementations, the app code, app/service templates, and/or policies 35 may be developed using a development (dev) environment, programming language(s), and/or dev-tools provided by the system 16.

The API(s) 32 may be implemented as a remote API or a web API, such as a Representational State Transfer (REST or RESTful) API, Simple Object Access Protocol (SOAP) API, salesforce.com Apex API, and/or some other like API. The API 32 may be implemented as a web service including, for example, Apache® Axi2.4 or Axi3, Apache® CXF, a JSON-Remote Procedure Call (RPC) API (e.g., Ethereum JSON-RPC API implemented by a public or enterprise Ethereum® blockchain platform), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like.

In some implementations, the API(s) 32 may include one or more public APIs and one or more private APIs. The public APIs are APIs that includes one or more publically exposed endpoints that allows user systems 12 to access tenant data. These endpoints specify where resources are located and/or how particular web services can be accessed. The app(s) 12$y$ (see e.g., FIG. 1A and FIG. 2) may be used to generate and transmit a message (e.g., an HTTP message) with a user-issued query and a suitable URI/URL to access of an endpoint of the system 16. In embodiments, one or more of the APIs 32 may be an asynchronous ("async") query API, where the user-issued query includes an API call or other like instruction indicating that a user-issued query should be treated as an aysnc query (referred to as an "async query verb"). The async query verbs to invoke the async query API 32 may be defined and/or coded using PL/SOQL 34 or some other suitable programming or query language. When an async query invokes the async query API, an async query engine (e.g., a query engine 103) or async query scheduler may generate a corresponding async query job. The term "job" as used herein refers to a unit of work or execution that performs work that comprises one or more tasks. Individual jobs may have a corresponding job entity comprising a record or DB object that stores various values, statistics, metadata, etc. during the lifecycle of the job or until the job is executed, which are placed in a schedule or queue and executed from the queue, in turn. An async query job entity corresponding to an async query job is a job entity existing for the during the lifecycle of an async query, which is placed in a schedule or queue and executed by the async query engine, in turn. The async public API may be implemented as a REST or RESTful API, SOAP API, Apex API, and/or some other like API, such as those discussed herein.

Private APIs are APIs 32 that are private or internal to the system 16, which allows system applications (e.g., tenant management process 110, system process 102, query engine(s) 103, stream processor(s) 105, and validation processor(s) 105 to access other system applications. The private APIs 32 may be similar to the public APIs 32 except that the endpoints of the private APIs 32 are not publically available or accessible. The private APIs 32 may be made less discoverable by restricting users, devices, and/or applications from calling or otherwise using the private APIs 32. For example, use of the private APIs 32 may be restricted to machines inside a private network (or an enterprise network), a range of acceptable IP addresses, applications with IDs included in a whitelist or subscriber list, requests/calls that include a particular digital certificate or other like credentials, and/or the like. The private APIs may be implemented as a REST or RESTful API, SOAP API, Apex API, a proprietary API, and/or some other like API.

Each application server 100 is communicably coupled with tenant DB 22 and system DB 24, for example, having access to tenant data 23 and system data 25, respectively, via a different network connection 15. For example, one application server 100$_1$ can be coupled via the network 14 (e.g., the Internet), another application server 100$_N$ can be coupled via a direct network link 15, and another application server 100$_N$ can be coupled by yet a different network connection 15. Transfer Control Protocol and Internet Protocol (TCP/

IP) are examples of typical protocols that can be used for communicating between application servers 100 and the system 16. However, it will be apparent to one skilled in the art that other transport protocols can be used to optimize the system 16 depending on the network interconnections used. The application servers 100 may access the tenant data 23 and/or the system data 25 using suitable private APIs as discussed previously.

In some implementations, each application server 100 is configured to handle requests for any user associated with any org that is a tenant of the system 16. In this regard, each application server 100 may be configured to perform various DB functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or org to a specific application server 100. In some such implementations, an interface system implementing a load balancing function (e.g., an F5 Big-IP load balancer) is communicably coupled between the application servers 100 and the user systems 12 to distribute requests to the application servers 100. In one implementation, the load balancer uses a least-connections algorithm to route user requests to the app servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and orgs.

In one example storage use case, one tenant can be an org (org) that employs a sales force where each salesperson uses system 16 to manage aspects of their sales. A user can maintain contact data, leads data, customer follow-up data, performance data, goals and progress data, etc., all applicable to that user's personal sales process (e.g., in tenant DB 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be org-wide data shared or accessible by several users or all of the users for a given org that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant DB 22 or system DB 24. The system 16 (e.g., an application server 100 in the system 16) can automatically generate one or more native queries (e.g., SQL statements or SQL queries or the like) designed to access the desired information from a suitable DB. To do so, the system 16 (e.g., an application server 100 in the system 16) may include one or more query engines 103, which is/are a software engine, SDK, object(s), program code and/or software modules, or other like logical unit that takes a description of a search request (e.g., a user query), processes/evaluates the search request, executes the search request, and returns the results back to the calling party. The query engine(s) 103 may be program code that obtains a query from a suitable request message via the network interface 20 that calls a public API, translates or converts the query into a native query (if necessary), evaluates and executes the native query, and returns results of the query back to the issuing party (e.g., a user system 12). To perform these functions, the query engine(s) 103 include a parser, a query optimizer, DB manager, compiler, execution engine, and/or other like components. In some implementations, each of the illustrated DBs may generate query plans to access the requested data from that DB, for example, the system DB 24 can generate query plans to access the requested data from the system DB 24. The term "query plan" generally refers to one or more operations used to access information in a DB system. Additionally, the query engine(s) 103 may control or enforce the order in which queries and/or transactions are processed.

The query engine(s) 103 may include any suitable query engine technology or combinations thereof. As examples, the query engine(s) 103 may include direct (e.g., SQL) execution engines (e.g., Presto SQL query engine, MySQL engine, SOQL execution engine, Apache® Phoenix® engine, etc.), a key-value datastore or NoSQL DB engines (e.g., DynamoDB® provided by Amazon.com®, MongoDB query framework provided by MongoDB Inc.®, Apache® Cassandra, Redis™ provided by Redis Labs®, etc.), MapReduce query engines (e.g., Apache® Hive™, Apache® Impala™ Apache® HAWQ™, IBM® Db2 Big SQL®, etc. for Apache® Hadoop® DB systems, etc.), relational DB (or "NewSQL") engines (e.g., InnoDB™ or MySQL Cluster™ developed by Oracle®, MyRocks™ developed by Facebook.com®, FaunaDB provided by Fauna Inc.), PostgreSQL DB engines (e.g., MicroKernel DB Engine and Relational DB Engine provided by Pervasive Software®), graph processing engines (e.g., GraphX of an Apache® Spark® engine, an Apache® Tez engine, Neo4J provided by Neo4j, Inc.™, etc.), pull (iteration pattern) query engines, push (visitor pattern) query engines, transactional DB engines, extensible query execution engines, package query language (PaQL) execution engines, LegoBase query execution engines, and/or some other query engine used to query some other type of DB system (such as any processing engine or execution technology discussed herein). In some implementations, the query engine(s) 103 may include or implement an in-memory caching system and/or an in-memory caching engine (e.g., memcached, Redis, etc.) to store frequently accessed data items in a main memory of the system 16 for later retrieval without additional access to the persistent data store.

Each DB can generally be viewed as a collection of objects, such as a set of logical tables, containing data fitted into predefined or customizable categories. As used herein, a "database object", "data object", or the like may refer to any representation of information in a DB that is in the form of an object or tuple, and may include variables, data structures, functions, methods, classes, DB records, DB fields, DB entities, associations between data and DB entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM DB can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM DB applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant DB system. In some implementations, for example, all custom entity data rows are stored in a single multi-tenant physical table, which may contain multiple logical tables per org. It is transparent to customers that their multiple "tables" are in fact stored in one large table or that their data may be stored in the same table as the data of other customers.

Each application server 100 is also communicably coupled with a backend cloud system including one or more cloud compute nodes 150$_{1-Y}$ (where Y is a number; and collectively referred to as "cloud nodes 150," "cloud system 150," "cloud node 150", or the like), which may also interact with the DBs 22 and 24. The cloud system 150 provides various cloud computing services to CP 50 and/or user systems 12 such as providing cloud services (see e.g., FIG. 1A), for CPs 50 to operate their distributed applications and services. In various embodiments, the cloud computing services may include the blockchain services discussed herein. For example, one or more CPs 50 may provide marketing services, finance and operations services, AI/ML services, and/or other like services using the infrastructure and/or platforms provided by the cloud system 150.

The cloud compute nodes 150 may comprise one or more pools of servers, associated data storage devices, and/or other like computer devices dedicated to running/executing order management/processing and/or scheduling/queueing processes, procedures, etc. These servers may include the same or similar processor systems, memory systems, network interface, and other like components as the app servers 100 or other computer systems discussed herein. In some implementations, the servers may be or act as virtualization infrastructure for the cloud system 150. The virtualization infrastructure may comprise various hardware and software components and/or resources that are used to execute virtual or reconfigurable implementations of the cloud system 150, as well as individual components and/or subsystems. The cloud computing services provided by the cloud system 150 may be provided/implemented using virtualization and/or user-level isolation. Virtualization may refer to the abstraction of one or more isolated VMs, which are virtual versions of computer hardware platforms, storage devices, and/or network resource(s) that are operated by a virtual machine monitor (VMM) and/or hypervisor on shared computing resources. Each VM may operate one or more applications to perform various functions and/or provide various services to individual tenants and/or users. User-level isolation (also known as "containerization" or "operating system virtualization") may refer to the abstraction of multiple isolated tenant or user-space instances that may operate their own applications or services, run on a single host, and access a same OS kernel. Each tenant or user-space instance are virtualized and software-defined environments in which software applications can run in isolation of other software running on a physical host machine. The isolated user-space instances may be implemented using any suitable OS-level virtualization technology such as Docker® containers, Kubernetes® containers, Solaris® containers and/or zones, OpenVZ® virtual private servers, DragonFly BSD® virtual kernels and/or jails, chroot jails, sandboxes, and/or the like.

II. Mobile Application Customization Embodiments

Figure 2:
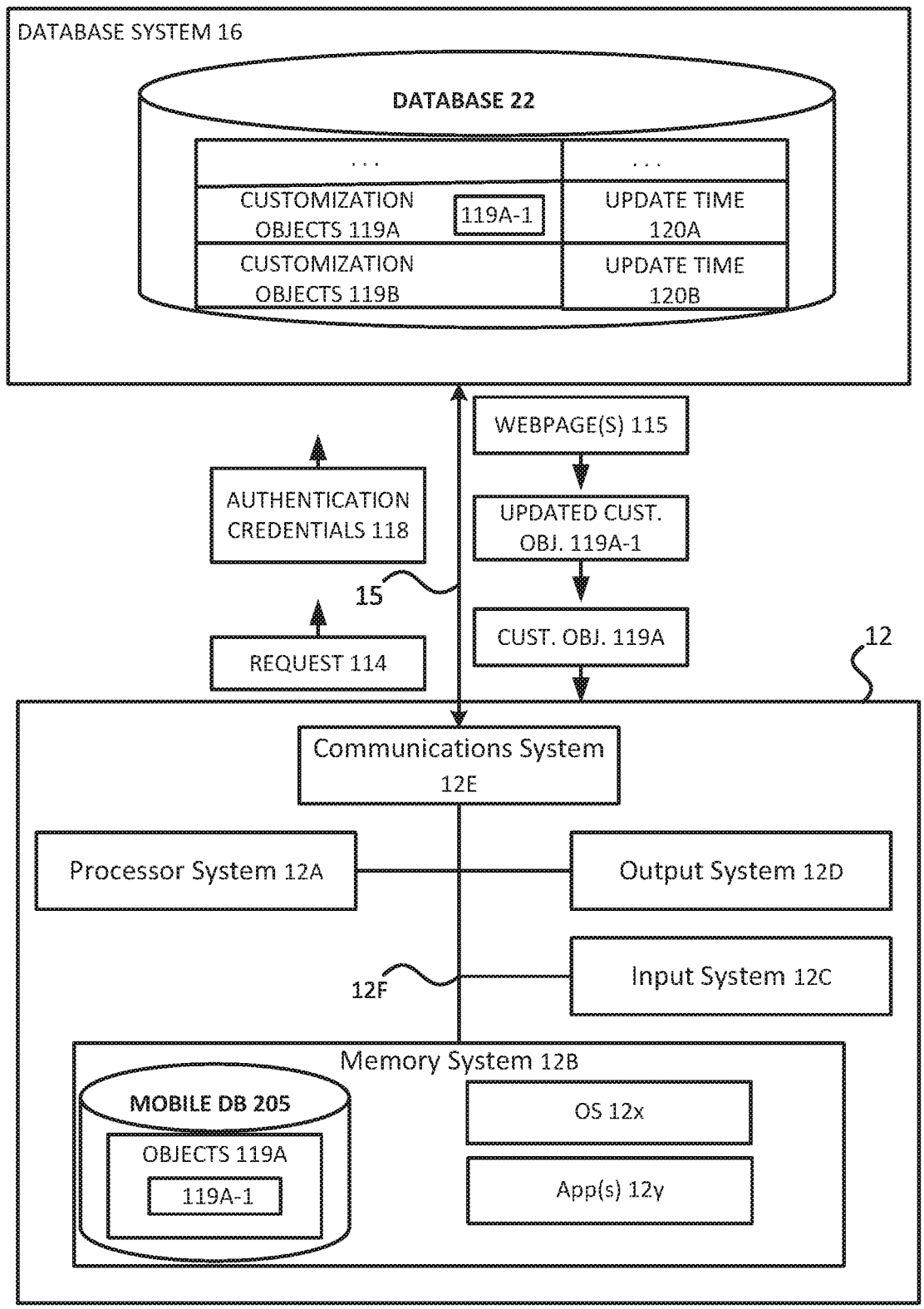
FIG. 2 shows the components of a user system in relation to elements of a database system, in accordance with various example embodiments.

FIG. 2 shows the components of a user system 12 in relation to elements of the system 16, in accordance with various example embodiments. In addition to the processor system 12A, the memory system 12B, the input system 12C, and the output system 12D discussed previously, the user system 12 may also include a communications system 12E. The components of user system 12 may be coupled with each other by interconnect (IX) 12F at least as shown by FIG. 2.

During operation, memory system 12B may include operating system (OS) 12$x$, mobile DB 205, and app 12$y$. OS 12$x$ may manage computer hardware and software resources, and provide common services for applications of the user system 12. OS 12$x$ may include one or more drivers and/or APIs that provide an interface to hardware devices thereby enabling OS 12$x$ and app 12$y$ to access hardware functions without needing to know the details of the hardware itself. In some embodiments, the OS 12$x$ may include middleware that may connect two or more separate applications or connect applications with underlying hardware components beyond those available from OS 12$x$ and/or the drivers/APIs. The OS 12$x$ may be a general purpose OS or an OS specifically written for and tailored to the user system 12 platform.

In various embodiments, the app 12$y$ is a mobile application, which is a software application designed to run on the user system 12 when the user system 12 is implemented in a mobile device, such as a smartphone, tablet, wearable device, and the like. Program code and/or software modules of the app 12$y$ may be executed by the processor system 12A. The app 12$y$ may be a native app, a web app, or a hybrid app. Native apps may be used for operating the user system 12 (e.g., accessing and/or utilizing one or more sensors of the user system 12 and other like functions of the user system 12), may be platform or OS specific. Native apps may be pre-installed in memory system 12B during manufacturing, or provided to the memory system 12B by a vendor or service provider (e.g., an owner/operator of system 16 including a cloud computing service, an enterprise information technology service, a CRM system, and/or the like) via network 14 and communications system 12E using over-the-air (OTA) interfaces. In embodiments where the app 12y is implemented as a native app, the app 12y may include a container for rendering application-specific webpages.

Web apps are applications that load into a web browser of the user system 12 in response to requesting the web app from a service provider (e.g., a web server that may be associated with system 16). Web apps may be websites that are designed or customized to run on a mobile device by taking into account various mobile device parameters, such as resource availability, display size, touchscreen input, and the like. In this way, web apps may provide an experience that is similar to a native app within a web browser. Web apps may be any server-side application that is developed with any server-side development tools and/or programming languages, such as PHP, Node.js, ASP.NET, and/or any other like technology that renders Hypertext Markup Language (HTML).

Hybrid apps may be a hybrid between native apps and web apps. Hybrid apps may be a standalone skeleton or other like application container that may load a website within the application container. Hybrid apps may be written using website development tools and/or programming languages, such as HTML5, Cascading Stylesheets (CSS), JavaScript, Kotlin, and/or the like. Hybrid apps use a browser engine of the user system 12, without using a web browser of the user system 12, to render a website's services locally. Hybrid apps may also access mobile device capabilities that are not accessible in web apps, such as the one or more sensors, local storage, and the like.

Regardless of whether the app 12y is implemented as a native app, web app, or hybrid app, the processor system 12A implementing the app 12y may be capable of requesting, obtaining, and rendering webpages in an application container or browser. In various embodiments, the app 12y may be capable of rendering a customized version of such webpages using data stored in the mobile DB 205, and/or executing tasks or other applications based on the data stored in the mobile DB 205. Furthermore, app 12y may be capable of executing tasks or applications based on instructions received from system 16, such as updating the mobile DB 205 with updated versions of customization objects 119.

In various embodiments, the owner/operator of system 16 may have pre-built the app 12y for use by agents of an org, and a user of the user system 12 may be an agent of the org. In this regard, the owner/operator of system 16 may provide the ability for the org (e.g., app developers, software engineers, etc.) to customize the app 12y to implement custom functionality unique to the needs/demands of the org. In some embodiments, the owner/operator of system 16 may provide SOAP, REST, and/or metadata APIs to allow the org to create or update customization objects 119 for customizing the app 12y.

The mobile DB 205 comprises a collection of data/metadata used to operate the app 12y, and/or includes data/metadata to customize the app 12y. The mobile DB 205 may also be referred to as a "metadata DB," "client DB," "mobile cache," "metadata cache," and the like. Each individual data item (or metadata items) used to customize the app 12y may be referred to as a "customization object," "app metadata," "app runtime parameter," "app runtime configuration data," or "app runtime customization," "entity metadata item," and/or the like.

The customization objects 119 may be objects that store data unique to a specific user, a specific org, a specific user interface (UI). Additionally or alternatively, the customization objects 119 may be external objects that map to data stored outside of the system 16 and/or external systems. The customization objects 119 or metadata may be a collection of entities. Additionally, customization objects 119 may be used to extend the functionality of standard non-customizable objects. The customizations to the app 12y may include rendering a webpage in a client or container of the app 12y in a customized manner; creation and implementation of custom fields, links, objects, page layouts, buttons, record types, tabs, etc.; hosting or embedding a separate native app, hybrid app, web app, media (locally or remotely stored), files (locally or remotely stored), etc. in the container/skeleton of the app 12y; executing org-specific tasks/applications (locally or remotely stored); and/or other like customizations.

In some embodiments, each customization object 119 corresponds to a DBO or entity, which describes the kinds/types of data stored in an org's DB (e.g., DB 22). Each DBO/entity corresponds to a particular DB (e.g., DB table) comprising one or more fields or attributes (e.g., table columns), one or more records (e.g., table rows), and/or relationships between different DBOs or records/fields within individual DBOs. Some DBO/entity metadata is used to define and/or control the types/kinds of fields and/or records that can be created and/or edited, and what kind of actions can be performed on particular fields and/or records. In these embodiments, the customization objects 119 may define the actions that may be performed on the org data.

In embodiments, the customization objects stored in mobile DB 205 may be the same or substantially mirror the customization objects 119 allocated to a user of user system 12 and/or an org associated with app 12y. For example, the customization objects 119A may be associated with the user of the user system 12 and/or the org associated with app 12y, whereas the customization objects 119B may be associated with another user system 12 and/or another org. In some embodiments, customization objects 119 may be the same or similar as the app metadata 116 stored in tenant DB 22 discussed previously with regard to FIGS. 1A and 1B.

When a user of the user system 12 uses the app 12y to log into the system 16 to access an associated tenant space, the user system 12 may obtain a copy of the customization objects 119A for storage in the mobile DB 205. To this end, the user system 12 using the communications system 12E may establish a link 15 (also referred to as "channel 15," 'networking layer tunnel 15," and the like) with the system 16 to provide authentication credentials 118 to the system 16 and to obtain the copy of the customization objects 119A. Once the customization objects 119A are received over the link 15, the communications system 12E may provide the customization objects 119A to the app 12y for storage in the mobile DB 205. In embodiments, authentication can occur at initial login or during an initial connection with a server (e.g., app server 100, an on-premises server of CP 50, or the like). In many systems, a key, token, and/or credentials 118 is/are exchanged at login. In other cases, the key, token, and/or credentials 118 may be requested by the app 12y prior to performing a set of actions. In either case, the use of a key to encrypt/decrypt traffic, the exchange of a token, and/or the matching of provided credentials with stored credentials may be considered "authentication" for purposes of the present disclosure. Additionally or alternatively, "authentication" may also refer to performance of an authorized transaction, and authenticated transaction, and/or the like.

In some embodiments, the first time the mobile app 12y is used, all the metadata is obtained by the mobile app 12y, including customization objects 119 and/or other metadata used by the app 12y. Here, the "first time" may refer to the very first time a user or user system 12 executes the app 12y (having never done so before), or upon an initialization of the app 12y (even when the app 12y has been used before). After the first time the app 12y is used, a request for a webpage (e.g., page refresh), GUI element(s), updated data, updated metadata, or the like (e.g., using a suitable API may be called to request updated data, updated metadata, etc.) is used to identify and obtain any updated/changed metadata/customization objects 119 (e.g., updated/changed customization objects 119A-1). In these embodiments, user identifier, login/session identifier (ID), a timestamp, and/or other data associated with the user system 12 and/or the request may be used to identify the updated/changed metadata/customization objects 119.

In various embodiments, when a user or user system 12 is authenticated by the system 16, the system 16 may identify updated/changed customization objects 119A-1 in metadata DB 22 and provide the updated customization objects to the app 12y for storage in the mobile DB 205. To identify the updated customization objects 119A-1, the system 16 may query the metadata DB 22 to obtain an update time 120A of each customization object 119A. The update time may be an entry in the metadata DB 22 that indicates a time and/or date when each of the customization objects 119A were last edited and stored in the metadata DB 22 (e.g., by a developer of the org). Similarly, the update time 120B may indicate a time and/or date when each of the customization objects 119B were last edited and stored in the metadata DB 22 (e.g., by a developer of the other org). The system 16 may determine the updated customization objects 119A-1 to be ones of the customization objects 119A that have an update time 120A that is later than a previous login attempt by the user system 12 and/or later than a time of a previous authentication of the user system 12.

When the customization objects 119A and the updated customization objects 119A-1 are obtained by the user system 12, the user system 12 may use one or more applications or APIs that enable querying of the mobile DB 205 and/or storage of customization objects in the mobile DB 205. Any suitable querying language may be used to query and store information in mobile DB 205, such as structured query language (SQL), object query language (OQL), Salesforce® OQL (SOQL), Salesforce® object search language (SOSL), and/or other like query languages.

In addition, when the user system 12 is authenticated by the system 16, the database system 22 may provide one or more webpages 115 to the user system 12. The webpages 115 may be provided with the customization objects 119A and/or updated customization objects 119A-1. For example, after the user system 12 is authenticated, the system 16 may provide a home page, which may be one of the webpages 115, with the customization objects 119A. By way of another example, after the user system 12 is authenticated the user system 12 may send a request 114 for a webpage 115 to the system 16 over the link 15. In response to the request 114, the system 16 may obtain the updated customization objects 119A-1 associated with the requested webpage 115, and provide the updated customization objects 119A-1 with the requested webpage 115. In some embodiments, the webpages 115 may be provided subsequent to the customization objects 119A and/or updated customization objects 119A-1. For example, in response to the request 114, the system 16 may obtain the updated customization objects 119A-1 associated with the requested webpage 115, and provide the updated customization objects 119A-1 to the user system 12 and subsequently provide the requested webpage 115.

IX 12F enables communication and data transfer between processor system 12A, memory system 12B, and other subsystems of the user system 12. IX 12F may comprise any number and/or combination of bus and/or IX technologies such as a high-speed serial bus, parallel bus, Industry Standard Architecture (ISA), extended ISA, inter-integrated circuit ($I^2C$), Serial Peripheral Interface, universal serial bus (USB), Front-Side-Bus (FSB), Peripheral Component Interconnect (PCI), a PCI-Express (PCI-e), PCI extended (PCIx), Small Computer System Interface (SCSI), SCSI parallel interface, universal asynchronous receiver/transmitter (UART), point-to-point interfaces, power management bus (PMBus), Intel® Ultra Path Interconnect (UPI), Intel® Accelerator Link, Intel® Common Express Link (CXL), RapidIO™ system IXs, CCIX, Gen-Z Consortium IXs, a HyperTransport interconnect, NVLink provided by NVIDIA®, Coherent Accelerator Processor Interface (CAPI), OpenCAPI, Intel® QuickPath Interconnect (QPI), Intel® Omni-Path Architecture IX, and/or any number of other IX technologies for transferring data between components within user system 12 including proprietary IX/buses.

Communications system 12E may include circuitry for communicating with a wireless network and/or cellular network. Communications system 12E may be used to establish the networking layer tunnel 15 through which the user system 12 may communicate with the system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), and/or a wireless personal area network (WPAN) protocol (e.g., IEEE 802.15.4-802.15.5 protocols including ZigBee, WirelessHART, 6LoWPAN, etc.; or Bluetooth or Bluetooth low energy (BLE) and the like). The communications system 12E may also include hardware devices that enable communication with wireless networks and/or other user systems 12 using modulated electromagnetic radiation through a non-solid medium. Such hardware devices may include switches, filters, amplifiers, antenna elements, and the like to facilitate the communication OTA by generating or otherwise producing radio waves to transmit data to one or more other devices via the one or more antenna elements, and converting received signals from a modulated radio wave into usable information, such as digital data, which may be provided to one or more other components of user system 12 via bus 12F.

Although FIG. 2 illustrates various components of user system 12, in some embodiments, user system 12 may include many more components than those shown in FIG. 2. For example, in some embodiments, the user system 12 may include a display module (e.g., as part of the output system 12D), an input/output (I/O) interface (as part of the input system 12C, for example), a power management integrated circuit (PMIC), network interface controller, one or more sensors (e.g., an image sensor or camera, one or more biometric sensors, gyroscope sensors, accelerometers, gravimeters, compass/magnetometers, altimeters, barometers, proximity sensors, ambient light sensors, thermal sensors, ultrasonic transceivers, and/or positioning circuitry such a Global Positioning System (GPS)) modules, and/or other like components). However, it is not necessary to show and describe such components to illustrate the example embodiments.

Figure 3:
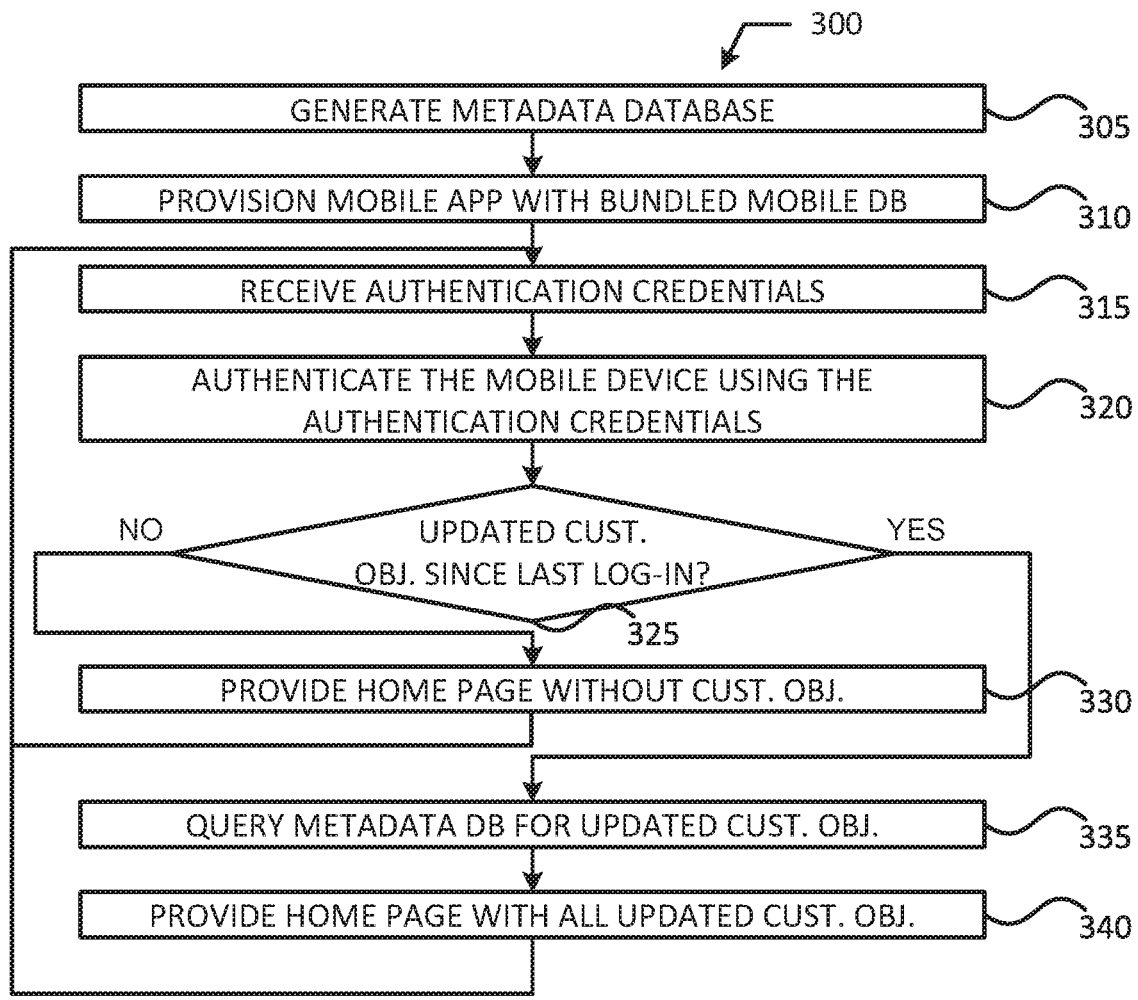
FIG. 3 illustrates a process for providing customization objects to a mobile device, in accordance with various example embodiments.

FIG. 3 illustrates a process 300 for providing customization objects to a mobile device, in accordance with various example embodiments. For illustrative purposes, the operations of process 300 will be described as being performed by system 16 discussed with regard to FIGS. 1A, 1B, and 2. However, it should be noted that other computing devices may operate the process 300 in a multitude of implementations, arrangements, and/or environments. In some embodiments, process 300 may be implemented by one or more other processes of the system 16, such as tenant management process 110 and/or a tenant management process 104 described previously. In addition, while particular examples and orders of operations are illustrated in FIG. 3, in various embodiments, these operations may be re-ordered, separated into additional operations, combined, or omitted altogether.

Referring to FIGS. 2 and 3, at operation 305, the system 16 may generate a metadata DB 22 to be associated with a particular mobile device (e.g., user system 12) or an org that is associated with a plurality of mobile devices that utilize a customizable app 12y on behalf of the org. In embodiments, the metadata DB 22 may be stored in or associated with a tenant space 112 of a mobile device or org within tenant DB 22. At operation 310, the system 16 may provision a mobile app 12y with a bundled mobile DB 205 in the user system 12. In embodiments, the mobile DB 205 may include the same customization objects 119A that are stored in the metadata DB 22. In some embodiments, operation 310 may occur when a user of user system 12 downloads and installs the app 12y. In embodiments where the user system 12 already includes the app 12y, at operation 310 the system 16 may provision the mobile DB 205 by instructing the user system 12 to store the mobile DB 205 in association with the app 12y.

At operation 315, the system 16 may receive authentication credentials 118 from the user system 12, and at operation 320 the system 16 may authenticate the user system 12 using the authentication credentials 118. At operation 325, the system 16 may determine whether any customization objects ("cust. obj.") 119A have been updated since a last time the user system 12 logged into the system 16. As an example, the metadata DB 22 may store an update time 120A indicating a time and date that customization objects 119A have been edited and stored in the metadata DB 22. Further, in some embodiments, the system 16 may log a time/date of each user authentication and may query the metadata DB 22 (e.g., using any of the aforementioned querying languages) to determine whether any of the customization objects 119A were edited and stored in the metadata DB 22 at a later time than the last authentication of the user system 12. Other procedures or processes may be used to determine whether the customization objects have been updated.

If at operation 325 the system 16 determines that no customization objects 119A have been updated since the last time the user system 12 logged into the system 16, then the system 16 may proceed to operation 330 to provide a home page (e.g., a webpage 115) to the user system 12 without any customization objects 119A. In embodiments, the user system 16 may obtain customization objects 119A associated with the home page 115 from the mobile DB 205 and render the home page 115 accordingly. After providing the home page 115 to the user system 12, the system 16 may proceed back to operation 315 to obtain authentication credentials 118 of the user system 12 at a next login.

If at operation 325 the system 16 determines that one or more customization objects 119A have been updated since the last time the user system 12 logged into the system 16, then the system 16 may proceed to operation 335 to query the metadata DB 22 for updated customization objects 119A-1. At operation 340, the system 16 may provide the home page to the user system 12 with all of the updated customization objects 119A-1 that were obtained from the metadata DB 22, which may be used to render the home page and other subsequently requested webpages 115. In embodiments, the system 16 may also send an instruction to the user system 12 indicating how and when the user system 12 should store the updated customization objects 119A-1. For example, in some embodiments, the system 16 may instruct the user system 12 to store the updated customization objects 119A-1 upon receipt of the updated customization objects 119A-1, while in other embodiments the system 16 may instruct the user system 12 to store the updated customization objects 119A-1 upon or after display of the home page 115.

In embodiments, the user system 12 may obtain non-updated customization objects 119A associated with the home page and/or subsequently requested webpages 115 from the mobile DB 205 and render the webpages 115 using both the updated customization objects 119A-1 and the non-updated customization objects 119A. After providing the home page and all of the updated customization objects to the user system 12, the system 16 may proceed back to operation 315 to obtain authentication credentials 118 of the user system 12 at a next login. The process 300 may repeat as necessary or end.

Figure 4:
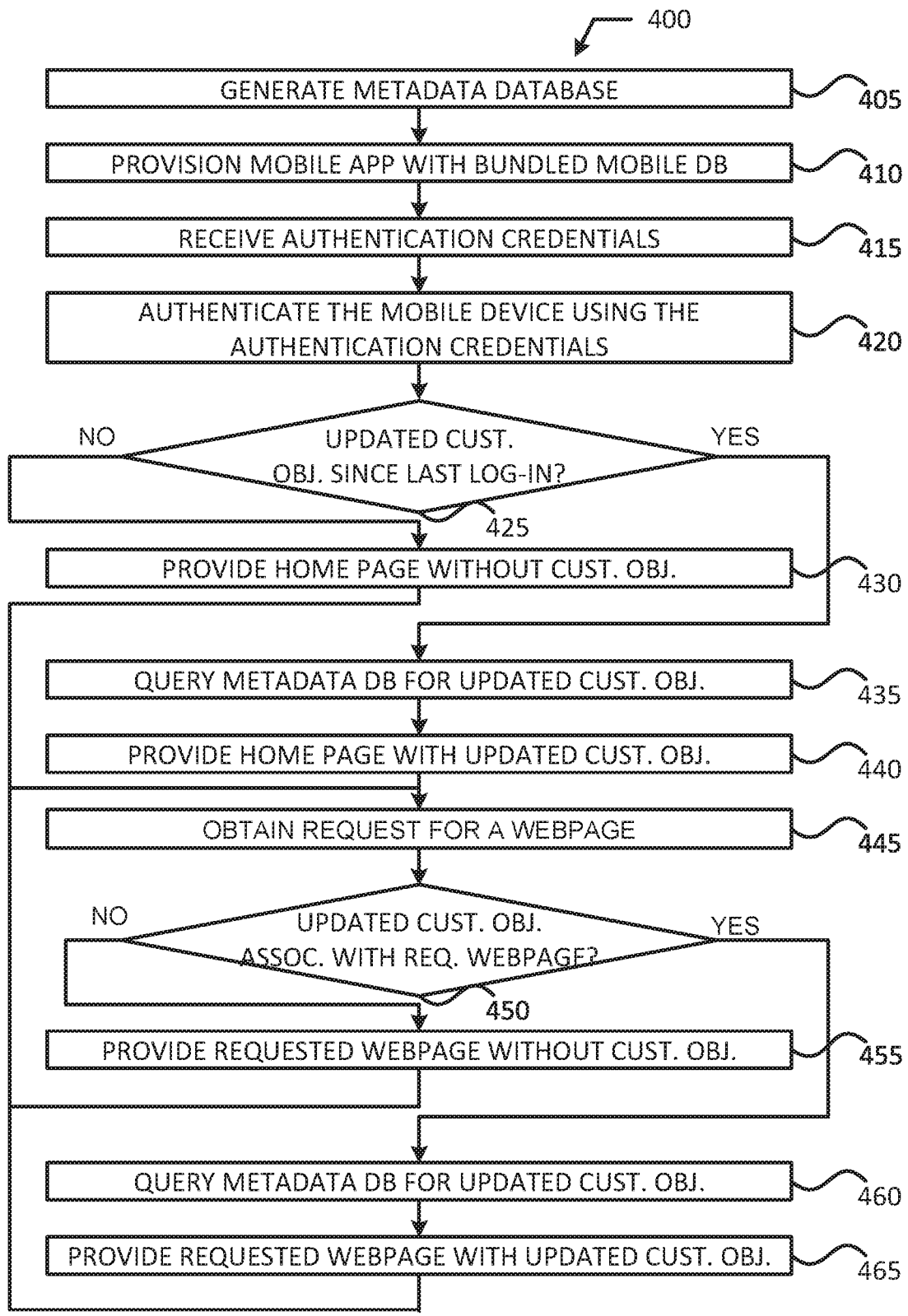
FIG. 4 illustrates another process for providing customization objects to a mobile device, in accordance with various example embodiments.

FIG. 4 illustrates another process 400 for providing customization objects to a mobile device, in accordance with various example embodiments. For illustrative purposes, the operations of process 400 will be described as being performed by system 16 discussed with regard to FIGS. 1A, 1B, and 2. However, it should be noted that other computing devices may operate the process 400 in a multitude of implementations, arrangements, and/or environments. In some embodiments, process 300 may be implemented by one or more other processes of the system 16, such as tenant management process 110 and/or a tenant management process 104 described previously. In addition, while particular examples and orders of operations are illustrated in FIG. 4, in various embodiments, these operations may be re-ordered, separated into additional operations, combined, or omitted altogether.

Referring to FIGS. 2 and 4, at operation 405, the system 16 may generate a metadata DB 22 to be associated with a particular mobile device (e.g., user system 12) or an org that is associated with a plurality of mobile devices that utilize a customizable app 12y on behalf of the org. Operation 405 may be the same or similar to operation 305 discussed with regard to FIG. 3. At operation 410, the system 16 may provision a app 12y with a bundled mobile DB 205 in the user system 12. Operation 410 may be the same or similar to operation 310 discussed with regard to FIG. 3.

At operation 415, the system 16 may receive authentication credentials 118 from the user system 12, and at operation 420 the system 16 may authenticate the user system 12 using the authentication credentials 118. At operation 425, the system 16 may determine whether customization objects 119A associated with a home page 115 have been updated since a last time the user system 12 logged into the system 16. Operations 415, 420, and 425 may be the same or similar to operations 315, 320, and 325, respectively, discussed with regard to FIG. 3.

If at operation 425 the system 16 determines that no customization objects 119A associated with the home page 115 have been updated since the last time the user system 12 logged into the system 16, then the system 16 may proceed to operation 430 to provide the home page 115 to the user system 12 without any customization objects 119A. In embodiments, the user system 12 may obtain non-updated customization objects 119A associated with the home page 115 from the mobile DB 205 and render the home page 115 using those customization objects 119A.

If at operation 425 the system 16 determines that one or more customization objects 119A of the home page 115 have been updated since the last time the user system 12 logged into the system 16, then the system 16 may proceed to operation 435 to query the metadata DB 22 for updated customization objects 119A-1. At operation 440, the system 16 may provide the home page 115 to the user system 12 with the updated customization objects 119A-1 that were obtained from the metadata DB 22. In embodiments, the system 16 may also send an instruction to the user system 12 indicating how and when the user system 12 should store the updated customization objects 119A-1 associated with the home page 115. For example, in some embodiments, the system 16 may instruct the user system 12 to store the updated customization objects 119A-1 upon receipt of the updated customization objects 119A-1 associated with the home page 115, while in other embodiments the system 16 may instruct the user system 12 to store the updated customization objects 119A-1 upon or after display of the home page 115. In embodiments, the user system 12 may obtain non-updated customization objects 119A associated with the home page 115 from the mobile DB 205 and render the home page 115 using both the updated customization objects 119A-1 and the non-updated customization objects 119A. After providing the home page and updated customization objects to the user system 12, the system 16 may proceed to operation 445 to obtain a request 114 for a webpage 115.

At operation 445, the system 16 may obtain a request 114 for a webpage 115 from app 12y, and at operation 450, the system 16 may determine whether any customization objects 119A associated with the requested webpage have been updated since a previous time that the user system 12 requested the webpage 115. Operation 450 may be performed in a same or similar manner as discussed previously with regard to operation 425. If at operation 450 the system 16 determines that no customization objects 119A have been updated since the previous time that the user system 12 requested that particular webpage 115, then the system 16 may proceed to operation 455 to provide the requested webpage 115 to the user system 12 without any customization objects 119A. After providing the requested webpage 115 to the user system 12, the system 16 may proceed back to operation 445 to obtain another request 114 for another webpage 115.

If at operation 450 the system 16 determines that one or more customization objects 119A have been updated since the previous time that the user system 12 requested the webpage 115, then the system 16 may proceed to operation 460 to query the metadata DB 22 for the updated customization objects 119A-1 associated with the requested webpage 115. At operation 460, the system 16 may provide the requested webpage 115 to the user system 12 with the updated customization objects 119A-1 that were obtained from the metadata DB 22 at operation 460. In embodiments, the system 16 may also send an instruction to the user system 12 indicating how and when the user system 12 should store the updated customization objects 119A-1 associated with the requested webpage 115. For example, in some embodiments, the system 16 may instruct the user system 12 to store the updated customization objects 119A-1 upon receipt of the updated customization objects 119A-1 associated with the requested webpage 115, while in other embodiments the system 16 may instruct the user system 12 to store the updated customization objects 119A-1 upon or after display of the requested webpage 115. After providing the requested webpage 115 and updated customization objects 119A-1 to the user system 12, the system 16 may proceed back to operation 445 to obtain another request 114 for another webpage 115. The process 400 may repeat as necessary or end.

Figure 5:
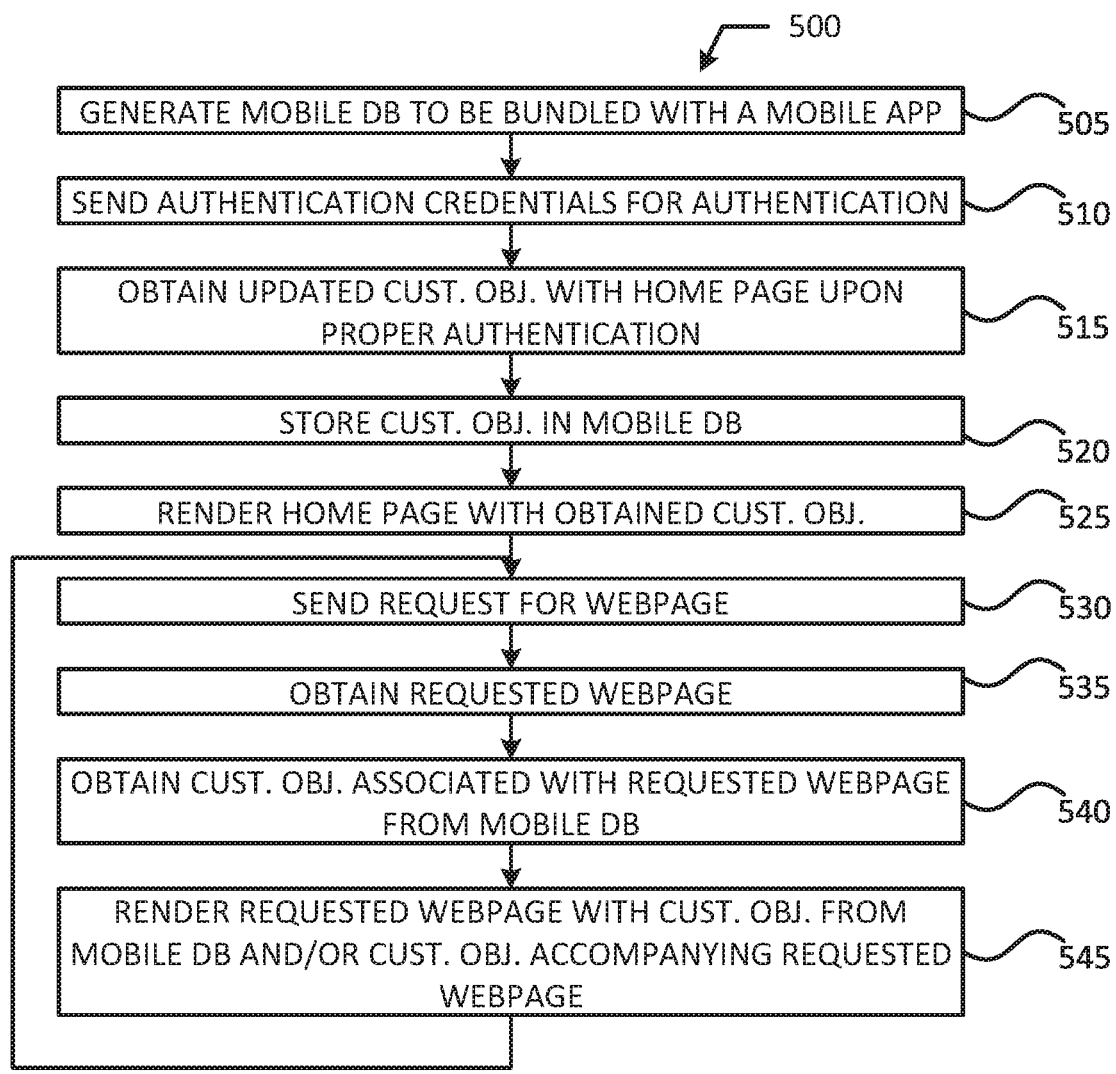
FIG. 5 illustrates a process for obtaining and rendering customization objects, in accordance with various example embodiments.

FIG. 5 illustrates a process 500 for obtaining and rendering customization objects, in accordance with various example embodiments. For illustrative purposes, the operations of process 500 will be described as being performed by user system 12 discussed with regard to FIGS. 1A, 1B, and 2. However, it should be noted that other computing devices may operate the process 500 in a multitude of implementations, arrangements, and/or environments. In addition, while particular examples and orders of operations are illustrated in FIG. 5, in various embodiments, these operations may be re-ordered, separated into additional operations, combined, or omitted altogether.

Referring to FIGS. 2 and 5, at operation 505, the user system 12 may generate a mobile DB 205 to be bundled with a app 12y. In some embodiments, the app 12y may have been previously installed in the memory system 12B. In other embodiments, the user system 12 may generate the mobile DB 205 during an installation process for the app 12y.

At operation 510, the user system 12 may send authentication credentials 118 to the system 16 for authentication of the user system 12. The authentication credentials 118 may include a user name, password, biometric data, a digital certificate associated with the user system 12, or any other suitable personal identification information associated with the user of the user system 12. The user system 12 may obtain at least some of the authentication credentials 118 via the input system 12C, which may be input into a login page that is rendered upon initialization of the app 12y. Some of the authentication credentials (e.g., the digital certificate) may be stored in memory system 12B, which may be provided to the system 16 upon establishment of the link 15, for example. At operation 515, the user system 12 may obtain updated customization objects 119A-1, if any, with a home page 115 upon proper authentication of the user system 12, and at operation 520 the user system 12 may store the obtained updated customization objects 119A-1 in the mobile DB 205. In some embodiments, the user system 12 may store the updated customization objects 119A-1 upon receipt of the updated customization objects 119A-1, while in other embodiments the user system 12 may store the updated customization objects 119A-1 upon or after display of the home page 115 (e.g., at or after operation 525).

At operation 525, the user system 12 may render the home page 115 with the obtained updated customization objects 119A-1. In embodiments, the user system 12 may obtain non-updated customization objects 119A associated with the home page 115 from the mobile DB 205 and render the home page 115 using both the updated customization objects 119A-1 and the non-updated customization objects 119A.

At operation 530, the user system 12 may send a request 114 for a webpage to the system 16, and at operation 535, the user system 12 may obtain the requested webpage 115 from the system 16. In embodiments, if there are any updated customization objects 119A-1 associated with the requested webpage 115, the user system 12 may obtain the updated customization objects 119A-1 with or subsequent to obtaining the requested webpage 115.

At operation 540, the user system 12 may obtain customization objects 119A associated with the requested webpage 115 from the mobile DB 205 using, for example, the previously mentioned querying languages. At operation 545, the user system 12 may render the requested webpage 115 with updated customization objects 119A-1 obtained with the requested webpage 115 and/or customization objects 119A obtained from the mobile DB 205. The requested webpage 115 may be rendered in a container of the app 12y. In some embodiments, the user system 12 may store the updated customization objects 119A-1 upon receipt of the updated customization objects 119A-1 (e.g., prior to rendering the requested webpage 115), while in other embodiments the user system 12 may store the updated customization objects 119A-1 upon or after display of the requested webpage 115 (e.g., at or after operation 545). Once the requested webpage 115 is rendered, the user system 12 may proceed back to operation 430 to send another request 114 for another webpage 115. The process 500 may repeat as necessary or end.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/ program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable media (NTCRM) comprising instructions for providing metadata to customize a mobile application (app), wherein execution of the instructions by a processor system of an enterprise server is operable to cause the enterprise server to:
   store, in a metadata database, metadata for customization of the mobile app, the metadata database being stored in an organization database associated with the enterprise server;
   in response to a mobile device connecting with the enterprise server, identify updated metadata items among the metadata, wherein the updated metadata items have been updated prior to the mobile device connecting with the enterprise server and later than a previous connection between the mobile device and the enterprise server; and
   in response to identification of the updated metadata items, provide the identified updated metadata items to the mobile device for storage in a metadata cache, the metadata cache being stored in a memory system local to the mobile device.

2. The one or more NTCRM of claim 1, wherein to identify the updated metadata, execution of the instructions are operable to cause the enterprise server to:
   query the metadata database to obtain a timestamp of corresponding metadata items indicating a time that the corresponding metadata items were changed since a last query.

3. The one or more NTCRM of claim 1, wherein to provide the updated metadata to the mobile device, the instructions are operable to:
   send the updated metadata to the mobile device in response to authentication of the mobile device or authentication of a user of the mobile device.

4. The one or more NTCRM of claim 1, wherein the instructions are operable to:
   in response to a request for a webpage, send the updated metadata items associated with the requested webpage to the mobile device for storage in the metadata cache.

5. The one or more NTCRM of claim 1, wherein the metadata for customization of the mobile app extend existing functionality of the mobile app.

6. The one or more NTCRM of claim 1, wherein the metadata for customization of the mobile app allow for creation and editing of custom fields and records.

7. The one or more NTCRM of claim 6, wherein the metadata for customization of the mobile app include customizations to a layout of a user interface or customizations to an arrangement of user interface elements.

8. The one or more NTCRM of claim 1, wherein the metadata for customization of the mobile app include customizations to respective user interface elements.

9. One or more non-transitory computer-readable media (NTCRM) comprising instructions for obtaining metadata for customization of a mobile application (app) that is implemented by a mobile device, wherein execution of the instructions by a processor of the mobile device is operable to cause the mobile device to:

send, to an enterprise server, a request to access a database entities via the mobile app;

obtain, in response to the request, updated metadata with source code for generating and rendering a graphical user interface (GUI) of the app, the GUI including GUI elements for accessing the database entities, the updated metadata having been updated subsequent to a previous request to access the database entities and earlier than sending the request, the updated metadata being metadata that are stored in a metadata database of the enterprise server;

store the updated metadata in a mobile database associated with the mobile app in a local memory system of the mobile device, the mobile database to store local versions of metadata for customization of the mobile app;

obtain, from the mobile database in the local memory system, one or more non-updated metadata; and generate and render the GUI using the updated metadata and the one or more non-updated metadata according to the source code.

10. The one or more NTCRM of claim 9, wherein, to obtain the updated metadata, execution of the instructions is to cause the mobile device to:

send, to the enterprise server, authentication information to authenticate a user of the mobile device to use the mobile app;

obtain, from the enterprise server upon proper authentication of the user, all of the updated metadata associated with the GUI.

11. The one or more NTCRM of claim 10, wherein the request is a request for a webpage for accessing the database entities, and the source code includes electronic documents for rendering the webpage.

12. The one or more NTCRM of claim 9, wherein the metadata for customization of the mobile app include customizations to create and edit custom fields and records, customizations to respective ones of the GUI elements, customizations to a layout of the GUI, customizations to an arrangement of the GUI elements.

13. The one or more NTCRM of claim 12, wherein the metadata for customization of the mobile app extend existing functionality of the mobile app.

14. An apparatus to be employed as an enterprise server, the apparatus comprising:

a processor system coupled with a memory system, the processor system and the memory system are configurable to:

generate a metadata database to be stored in a database system implemented by the enterprise server, the metadata database to store metadata for customization of a mobile application (app) implemented by a mobile device;

in response to receipt of a request from the mobile device via the mobile app, identify updated metadata from the metadata database, the updated metadata being metadata items that have been updated prior to receipt of the request and after receipt of a previous request from a user of the mobile device, the request being a request to connect with the enterprise server; and generate, in response to identification of the updated metadata, a response to include the updated metadata for storage in a metadata cache implemented locally by the mobile device; and a network interface communicatively coupled with the processor system, the network interface to: receive the request from the mobile device; and transmit the response to the mobile device.

15. The apparatus of claim 14, wherein to identify the updated metadata, the processor system is to:

query the metadata database to obtain information about each metadata item that has been changed since a previous query or since the previous request.

16. The apparatus of claim 14, wherein:

the processor system is to generate individual response messages in response to receipt of corresponding request messages obtained from the mobile device, the individual response messages to include one or more of the updated metadata to be sent to the mobile device; and the network interface is to receive the corresponding request messages from the mobile device and transmit the individual response messages to the mobile device.

17. The apparatus of claim 14, wherein the response is a first response, and the processor system is to:

generate the first response to include ones of the updated metadata associated with a first resource indicated by the request and upon proper authentication of the mobile device or upon proper authentication of; and generate a second response message to include other ones of the updated metadata associated with a requested second resource upon receipt of a second request for the requested second resource, the second resource being different than the first resource.

18. The apparatus of claim 14, wherein the metadata for customization of the mobile app extend existing functionality of the mobile app.

19. The apparatus of claim 14, wherein the metadata for customization of the mobile app allow for creation and editing of custom fields and records.

20. The apparatus of claim 14, wherein the metadata for customization of the mobile app include customizations to a layout of a user interface, customizations to an arrangement of user interface elements, or customizations to respective user interface elements.

* * * * *